United States Patent
Bradley et al.

(10) Patent No.: US 11,533,400 B2
(45) Date of Patent: Dec. 20, 2022

(54) METHOD, DEVICE, AND SYSTEM FOR SECURING AN ACCESS TO AT LEAST ONE SERVICE

(71) Applicant: THALES DIS FRANCE SAS, Meudon (FR)

(72) Inventors: Paul Bradley, Gemenos (FR); Nicolas Chalvin, Gemenos (FR); Emmanuel Payraud, Gemenos (FR)

(73) Assignee: THALES DIS FRANCE SAS, Meudon (FR)

(*) Notice: Subject to any disclaimer, the term of this patent is extended or adjusted under 35 U.S.C. 154(b) by 923 days.

(21) Appl. No.: 16/337,801

(22) PCT Filed: Oct. 4, 2017

(86) PCT No.: PCT/EP2017/075132
§ 371 (c)(1),
(2) Date: Mar. 28, 2019

(87) PCT Pub. No.: WO2018/065439
PCT Pub. Date: Apr. 12, 2018

(65) Prior Publication Data
US 2019/0239077 A1   Aug. 1, 2019

(30) Foreign Application Priority Data
Oct. 5, 2016   (EP) .................................... 16306304

(51) Int. Cl.
*H04M 15/00*   (2006.01)
*H04W 4/24*   (2018.01)
(Continued)

(52) U.S. Cl.
CPC ......... *H04M 15/00* (2013.01); *H04M 15/715* (2013.01); *H04M 17/02* (2013.01);
(Continued)

(58) Field of Classification Search
CPC .... H04M 15/00; H04M 15/715; H04M 17/02; H04M 17/103; H04W 4/60; H04W 12/082; H04W 4/20; H04W 4/24
See application file for complete search history.

(56) References Cited

U.S. PATENT DOCUMENTS 7,266,371 B1* 9/2007 Amin ...................... H04W 8/18
                                                                    455/418
9,788,209 B2* 10/2017 Hauck ................... H04W 12/04
(Continued)

FOREIGN PATENT DOCUMENTS

EP         1783997 A1    5/2007

OTHER PUBLICATIONS

International Search Report (PCT/ISA/210) dated Dec. 12, 2017, by the European Patent Office as the International Searching Authority for International Application No. PCT/EP2017/075132.
(Continued)

*Primary Examiner* — Benjamin M Thieu
(74) *Attorney, Agent, or Firm* — Marc Boillot; Thales DIS CPL USA, Inc (57) ABSTRACT

In a method for securing access to a service, a device is set in a restricted operation mode that allows addressing only a first server and that is associated with a first identifier relating to a first connectivity gateway. The device accesses the first identifier and a subscription profile that is active during the restricted operation mode. The first server receives from the device a request for enrolling a device user and at least one feature relating to a user identity. The first server verifies whether the user identity feature is valid. If the user identity feature is valid, the first server sends to the device a command for deactivating the restricted operation mode. The device deactivates the restricted operation mode while storing, instead of the first identifier, a second identifier relating to a second connectivity gateway. The second identifier allows accessing a second server that manages the service.

10 Claims, 1 Drawing Sheet

(51) Int. Cl.
*H04M 17/02* (2006.01)
*H04W 12/082* (2021.01)
*H04W 4/60* (2018.01)
*H04M 17/00* (2006.01)
*H04W 4/20* (2018.01)
*H04W 48/00* (2009.01)

(52) U.S. Cl.
CPC .......... *H04M 17/103* (2013.01); *H04W 4/20* (2013.01); *H04W 4/24* (2013.01); *H04W 4/60* (2018.02); *H04W 12/082* (2021.01); *H04W 48/17* (2013.01)

(56) References Cited

U.S. PATENT DOCUMENTS

| 2004/0176092 A1* | 9/2004 | Heutschi | H04W 4/60 455/433 |
| 2008/0242267 A1* | 10/2008 | Soni | H04M 15/715 455/411 |
| 2012/0077496 A1 | 3/2012 | Mathias et al. | |
| 2015/0111573 A1 | 4/2015 | Barton et al. | |

OTHER PUBLICATIONS

Written Opinion (PCT/ISA/237) dated Dec. 12, 2017, by the European Patent Office as the International Searching Authority for International Application No. PCT/EP2017/075132.

\* cited by examiner

METHOD, DEVICE, AND SYSTEM FOR SECURING AN ACCESS TO AT LEAST ONE SERVICE

FIELD OF THE INVENTION

The invention relates generally to a method for securing an access to at least one service. Furthermore, the invention also pertains to a device for securing an access to at least one service.

The present invention is notably applicable to a mobile (radio-communication) field wherein a (mobile) (tele)phone, as a device, may cooperate with a chip, to access a service(s). The chip may be embedded, such as an embedded Universal Integrated Circuit Card (or eUICC) or an integrated Universal Integrated Circuit Card (or iUICC) within a device, or removable, such as a chip included within a smart card termed Subscriber Identity Module (or SIM) type card or the like, as a Secure Element (or SE), from a chip host device. Within the present description, an SE is a smart object that includes a chip that protects, as a tamper resistant component, access to stored data and is intended to communicate data with an SE host device, like e.g., a phone.

Moreover, the invention also relates to a server for securing an access to at least one service. Finally, the invention pertains to a system for securing an access to at least one service as well.

STATE OF THE ART

US 2012/0077496 A1 describes a technique for registering a mobile device for a (cellular) data connection service. The device attempts to establish a first data connection with a main network identified by a main Access Point Name (or APN). The main network performs an authentication procedure to determine whether the device is authorized to access the main network. If not authorized, the device establishes a second data connection with a registration network identified by a registration APN. The registration APN allows the device to access a registration site that allows a user to register for the services provided by the main network. A mobile service provider completes a registration for the device for a service(s) selected by the user. The registration network sends to the main network a service registration update that indicates that the device is registered for the selected service(s) through the main APN. An HLR record for the IMSI of a SIM card cooperating with the device is created or updated for the device for the main network and stored in the HLR database. Once registered, the device establishes a third data connection with the main network by using the main APN.

EP 1 783 997 A1 describes a technique for activating a user account in a mobile network. A SIM card cooperating with a mobile terminal stores temporary credentials for a temporary account associated with a restricted service and permanent credentials for a permanent account associated with a normal service. Once the terminal is logged on a mobile operator network while using the temporary credentials, the card requires the terminal to display some questions on the terminal screen. The card collects from the terminal information about a user identity and sends to a remote server an SMS with the collected user identity information. The server (or another server connected hereto) checks whether the provided user identity information is valid. If yes, then the card receives a confirmation SMS, deactivates the temporary account and activates the permanent account. The card may then use the permanent credentials.

As known per se, when a person goes to a Point Of Sale (or POS) to get a prepaid subscription to a Mobile Network Operator (or MNO) or a Mobile Virtual Network Operator (or MVNO), the prepaid subscription may be obtained by the person without any real security. However, such an access to a service has to be performed in a more secure manner.

Thus, there is a need to provide a solution that allows securing an access to a service, like e.g., a prepaid subscription to a mobile network(s).

SUMMARY OF THE INVENTION

The invention proposes a solution for securing an access to at least one service. According to the invention, a device is set in a restricted operation mode. The restricted operation mode allows addressing only a first server. The restricted operation mode is associated with a first identifier relating to a first connectivity gateway. The first connectivity gateway allows accessing the first server. The device accesses the first identifier relating to the first connectivity gateway. The method comprises the following steps. The first server receives from the device or a chip a request for enrolling a device or chip user. The request for enrolling the device or chip user comprises or is accompanied with at least one feature relating to a user identity, as a user identity feature. The chip is embedded within or coupled to the device. The first server or another server connected to the first server verifies whether the at least one user identity feature is or is not valid. Only if the at least one user identity feature is valid, the first server or another server connected to the first server sends to the device or, through the device, to the chip a command message including a command for deactivating the restricted operation mode. The device or the chip deactivates the restricted operation mode while storing or letting store, instead of the first identifier relating to the first connectivity gateway, a second identifier relating to a second connectivity gateway. The second identifier relating to the second connectivity gateway allows accessing a second server. The second server manages the at least one service.

The principle of the invention consists in that a device, like e.g., a phone, is configured in a limited (or restricted) (operation) mode, so as to force the device to access only a first server, like e.g., an Over-The-Air (or OTA) type server. The device may cooperate with a chip. The device or the chip records a first identifier, like e.g., an Access Point of Name (or APN), relating to a first connectivity gateway. The first connectivity gateway allows connecting to the first server. The first identifier relating to the first connectivity gateway is registered by the device and/or the chip. The first server (or another server connected hereto) gets a feature(s) relating to a (device and/or chip) user identity, like e.g., information pertaining to the user, an IDentity (or ID) document, such as an ID card, a resident permit and/or a passport, after or with a (service) registration (or enrolment) request. The first server (or another server connected hereto) determines whether the user identity feature(s) is(are) or is(are) not valid. In the affirmative, the device or the chip receives from the server side a command for disabling or deactivating the restricted mode. To deactivate the restricted mode, the first identifier relating to the first connectivity gateway is replaced, under a server, the device or the chip control, by a second identifier relating to a second connectivity gateway. The second connectivity gateway allows connecting to the second server.

Such a restricted mode deactivation authorizes the (device and/or chip) user to access the service(s) that is(are) managed by the second server only when the user identity feature(s) is(are) successfully verified.

Contrary to the afore mentioned prior art solution, a user identity feature verification is unavoidable since the device is unable to access any server distinct from the first server that carries out or lets carry out such a previous mandatory user identity feature verification.

Accordingly, the invention method allows securing an access to a service(s) rendered available thanks to a successful user identity feature verification, as a secure operation occurring during a user enrolment process.

The invention method is automatically implemented.

Thus, the invention solution reduces a cost and a time needed to carry out a user identity feature verification with respect to a cost and a time needed with the afore specified prior art solution.

According to a further aspect, the invention is a device for securing an access to at least one service. According to the invention, the device is set in a restricted operation mode. The restricted operation mode allows addressing only a first server. The restricted operation mode is associated with a first identifier relating to a first connectivity gateway. The first connectivity gateway allows accessing the first server. The device accesses the first identifier relating to the first connectivity gateway. The device is configured to send a request for enrolling a device or chip user. The request for enrolling the device or chip user comprises or is accompanied with at least one feature relating to a user identity, as a user identity feature. The device is configured to receive a command message including a command for deactivating the restricted operation mode. The device is configured to deactivate the restricted operation mode while storing or letting store, instead of the first identifier relating to the first connectivity gateway, a second identifier relating to a second connectivity gateway. The second identifier relating to the second connectivity gateway allows accessing a second server. The second server manages the at least one service.

According to still a further aspect, the invention is a system for securing an access to at least one service. According to the invention, the system comprises at least a first server and at least one device. The device is set in a restricted operation mode. The restricted operation mode allows addressing only the first server. The restricted operation mode is associated with a first identifier relating to a first connectivity gateway. The first connectivity gateway allows accessing the first server. The device accesses the first identifier relating to the first connectivity gateway. The first server and/or another server connected to the first server is configured to receive from the device or a chip a request for enrolling a device or chip user. The request for enrolling the device or chip user comprises or is accompanied with at least one feature relating to a user identity, as a user identity feature. The chip is embedded within or coupled to the device. The first server and/or another server connected to the first server is configured to verify whether the at least one user identity feature is or is not valid. The first server and/or another server connected to the first server is configured to send, only if the at least one user identity feature is valid, to the device or, through the device, to the chip a command message including a command for deactivating the restricted operation mode. And the device or the chip is configured to deactivate the restricted operation mode while storing or letting store, instead of the first identifier relating to the first connectivity gateway, a second identifier relating to a second connectivity gateway. The second identifier relating to a second connectivity gateway allows accessing a second server. The second server manages the at least one service.

The system may further include a chip, such as an eUICC or an iUICC, that is embedded or integrated within or coupled to the device.

The chip may be fixed to, removable from, or mechanically independent from the device. The chip is preferably included within an SE. The invention does not impose any constraint as to a kind of the SE type.

As a removable SE, it may be a SIM type card, a Secure Removable Module (or SRM), a smart dongle of the USB (acronym for "Universal Serial Bus") type, a (micro-) Secure Digital (or SD) type card or a Multi-Media type Card (or MMC) or any format card (or another medium) to be coupled or connected to a chip host device.

As a chip mechanically independent from the device, it may be a wearable device, like e.g., a smart watch or a smart jewel, that exchanges, in a ContacT-Less (or CTL) manner, with the device.

As to the chip host device, it may be constituted by any electronic device, like e.g., a user terminal or a terminal comprising data processing means, data storing means and one or several Input/Output (or I/O) communication interfaces.

BRIEF DESCRIPTION OF THE DRAWINGS

Additional features and advantages of the invention will be more clearly understandable after reading a detailed description of one preferred embodiment of the invention, given as one indicative and non-limitative example, in conjunction with the following drawings.

DETAILED DESCRIPTION

Herein under is considered an embodiment in which the invention method for securing an access to a service(s) is implemented notably by a chip, like e.g., an eUICC or an iUICC, as a chip incorporated, possibly in a removable manner, in a Printed Circuit Board (or PCB) or a component of a (user) terminal, as a chip host device.

The chip may incorporate at least part of the terminal component(s), like e.g., a baseband processor(s), an application processor(s) and/or (an)other electronic component(s).

Alternately, instead of an eUICC or an iUICC, the chip may be a Trusted Execution Environment (or TEE), as a secure area of a terminal processor and a secured runtime environment.

The chip is preferably included within an SE. The SE may nevertheless have different form factors.

Instead of being embedded within its host device, the chip may be carried by a medium, such as a smart card, a dongle, like e.g., a USB type dongle, or a wearable device, like e.g., a smart watch, a smart jewel or any other smart accessory that may be carried by a user of the host device.

According to another embodiment (not represented), the invention method for securing an access to a service(s) is implemented by a terminal, like e.g., a mobile phone, as a standalone device. In other words, the terminal supports an application or an extended (or rich) Operating System (or OS) and does not cooperate with any chip, so as to secure an access to a service(s). According to such an embodiment (not represented), the device is adapted to carry out the functions that are carried out by the chip and the chip host device and that are described infra.

Naturally, the herein below described embodiment is only for exemplifying purposes and is not considered to reduce the scope of the invention.

Figure 1:
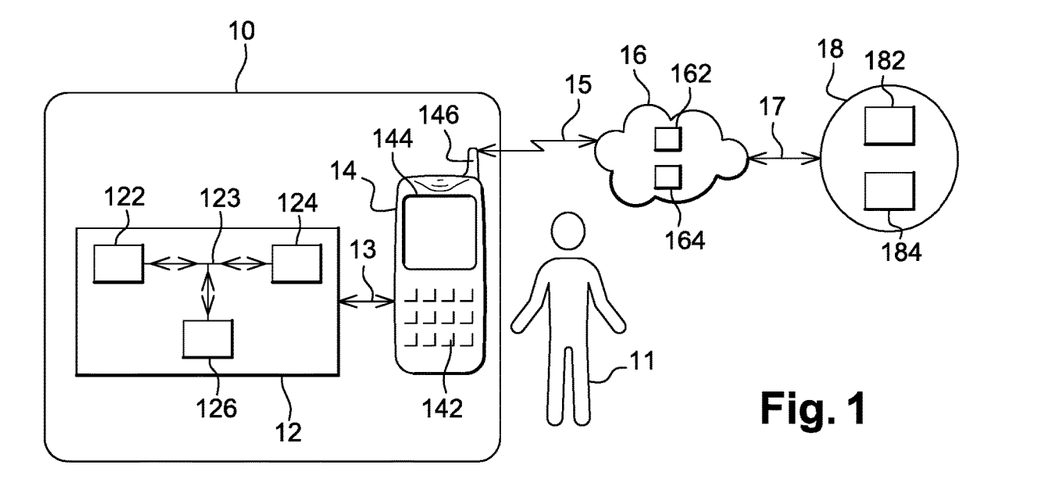
FIG. 1 is a simplified diagram of a terminal equipment configured in a restricted mode, a mobile network and a computer network, the computer network comprising a first and a second server, the terminal equipment comprising a phone and a chip, the phone accessing a first APN associated with the first server, the restricted mode allowing to address only the first server, the terminal equipment and the first server being arranged to secure an access to a service(s) managed by the second server, according to the invention.

FIG. 1 shows schematically a Terminal Equipment (or TE) 10, a home (and/or a visited) Mobile Network(s) 16 and a Computer Network 18.

The TE 10 includes a chip 12 and a mobile phone 14, as a (user) terminal and a chip host device. The TE 10 is used by a user 11, as a chip user and a chip host device user.

The (user) terminal may be fixed (i.e. not mobile) or mobile. The (user) terminal may be a Personal Digital Assistant (or PDA), a vehicle, a POS, a set-up box, a tablet computer, a Personal Computer (or PC), a desktop computer, a laptop computer, a video player, an audio player, a portable TeleVision (or TV), a media-player, a game console, a netbook or an electronic mobile accessory (like e.g., smart glasses, a smart watch or a smart jewel).

Instead of a phone, the user terminal may be any computer device including means for processing data, like e.g., a (micro)processor(s) and/or a (micro)controller(s), an I/O interface(s) for exchanging data with outside, and comprising (and/or being connected to) means for storing data.

For sake of simplicity, the chip 12, the mobile phone 14, the home (and/or visited) Mobile Network(s) 16 and the Computer Network 18 are termed infra the SE 12, the host 14, the MN(s) 16 and the CN 18 respectively.

The TE 10 is preferably under a radio coverage of the MN(s) 16.

The CN 18 includes a first server 182 and a second server 184.

For sake of simplicity, the first server 182 and the second server 184 are termed infra the SR1 182 and the SR2 184 respectively.

The host 14 is used for accessing, possibly through one or several mobile (radio-communication) MNs 16, the CN 18. The host 14 is used for accessing the SR1 182 and the SR2 184.

The host 14 incorporates, is coupled or connected to the SE 12 and communicates, through one or several bi-directional link(s) 13, with the SE 12.

The SE 12 is under control of a host 14 (micro)processor(s) (or (micro)controller(s)) (not represented), as host 14 data processing means. The SE 12 belongs preferably to the user, as a requester of an access to a service(s). The SE 12 user desires to access a service(s) managed by the SR2 184.

The SE 12 includes a (micro)processor(s) (and/or a (micro)controller(s)) 122, as data processing means, a memory(ies) 124, as data storing means, and one or several I/O interfaces 126 that are internally all connected, through an internal control and data bus 123, to each other.

The I/O interface(s) 126 allow(s) communicating data from the internal SE 12 components to the chip exterior and conversely.

The processor 122 processes, controls and communicates internally data with all the other components incorporated within the SE 12 and, through the I/O interface(s) 126, with the chip exterior.

The processor 122 is preferably able to initiate an action(s), in order to interact directly with the outside world, in an independent manner of the host 14. Such a capacity of interaction at the initiative of the SE 12 is also known as being a proactive capacity in which the SE 12 plays a role of a master while the host 14 plays a role of a slave. According to one preferred embodiment, the SE 12 is able to use a SIM ToolKit (or STK) type command(s) or the like, as a proactive command(s).

The processor 122 executes or runs one or several applications, like e.g., an invention application for securing an access to a service(s) as explained further infra.

The processor 122 launches preferably an execution of the invention application once the host 14 is switched on along with the SE 12 and when it is the first time that the SE 12 cooperates with the host 14.

The SE 12 (and more exactly the processor 122) is thus locked, i.e. configured or set, by default (after an SE manufacturing), in a restricted (operation) mode.

During the restricted mode, no any other action is rendered possible for the host 14 and/or SE 12 user until the SE 12 has executed the invention application and its execution result allows deactivating successfully the restricted mode and activating thus a non-restricted mode, i.e. allows accessing one or several services, as unrestricted or extended services managed by or through the SR2 184.

The set restricted mode allows addressing from the SE 12 (or the host 14) only the SR1 182 that manages a restricted (or limited) service including a user identity feature verification. The restricted mode is associated with an APN1, as a first APN and a first identifier relating to a first connectivity GateWay (or GW) 162 to the SR1 182. The first identifier relating to the first connectivity GW 162 allows identifying, in a unique manner, the first connectivity GW 162. The first connectivity GW 162 is included within the MN 16. The first connectivity GW 162 allows accessing the SR1 182.

The APN1 is associated with and dedicated to the SR1 182. The host 14, the SE 12 and/or another peripheral device(s) (not represented) incorporated within or coupled to the host 14 stores the APN1.

The set restricted mode may further include one or several phone call numbers dedicated to a predetermined service(s) and/or one or several numbers or data dedicated to a predetermined message service(s). The predetermined message service(s) may include a Short Message Service (or SMS) type message service(s), an SMS over IP (using e.g., an IP Multimedia Subsystem (or IMS)) type message service(s), a Multimedia Messaging Service (or MMS) type message service(s) and/or any other host originating message service(s) comprising a link, an hyperlink or the like to the SR1 182. An operation of the host 14 may be thus restricted with a phone call capacity and/or a message sending capacity(ies) to address only a predetermined service(s), like e.g., a customer service(s) managed by the home operator or on its behalf.

The memory 124 stores an OS. The memory 124 stores preferably a Uniform Resource Identifier 1 (or URI), a Uniform Resource Locator 1 (or URL) and/or an Internet Protocol (or IP) address 1 relating only to the SR1 182, as an identifier(s) relating to the SR1 182. The SR1 182 identifier(s) allow(s) identifying in a unique manner the SR1 182.

The memory 124 stores preferably, as one (service) subscription profile:

an International Mobile Subscriber Identity (or IMSI), an IP Multimedia Private Identity (or IMPI) and/or an IP Multimedia PUblic identity (or IMPU), as data for identifying a subscriber and a (service) subscription identifier for accessing the MN(s) 16;

a key Ki, as a key for authenticating the subscriber to the MN(s) 16 and a Network Authentication Key (or NAK), allowing to authenticate the subscriber to the MN(s) 16;

Milenage (or the like), as a network authentication algorithm, allowing to authenticate the subscriber to the MN(s) 16;

a file system including one or several Elementary Files (or EF);

one or several security keys, like e.g., a key(s) for ciphering/deciphering data and/or a key(s) for signing data a key(s), as secret data; and/or one or several credentials, like e.g., a user name and/or an IDentifier (or ID) of the subscriber, as data relating to the user.

The subscription profile includes a set of credentials, such as an IMSI and a Ki, that allow the subscriber to be identified and authenticated by the MN(s) 16.

The subscription may be a prepaid or post-paid subscription associated with an MNO, a MVNO or a service provider, or the like.

The memory 124 may store a Network Access Identifier (or NAI), an Integrated Circuit Card Identifier (or ICCID), a Chip or Card Serial Number (or CSN), a User Identity Module IDentifier (or UIMID)/Expanded User Identity Module IDentifier (or EUIMID), an eUICC IDentifier (or eID), a URL, an IP address and/or an email address, as an identifier(s) relating to the SE 12. The SE 12 identifier(s) allow(s) identifying, in a unique manner, the SE 12.

The memory 124 may store an International Mobile Equipment Identity (or NEI), a Mobile Equipment IDentifier (or MEID), an Electronic Serial Number (or ESN), a URI, a URL, an IP address and/or an email address, as an identifier(s) relating to the host 14. The host 14 identifier(s) allow(s) identifying, in a unique manner, the host 14. The memory 124 may store one or several features relating to a user identity.

The feature(s) relating to the user identity may include e.g., a user first name(s), a user last name(s), a user email address(es), a user phone number(s), a user residency address(es), a user ID document(s), like e.g., a user ID card, a user resident permit and/or a user passport, a proof(s) of user residency, such as a utility bill(s) and/or a tax report(s), a user picture(s), a user video movie(s), a user biometric print(s), a user palm print(s), a user voice print(s). The user identity feature(s) include(s) preferably at least certain security features that have preferably to comply with corresponding reference security features that are registered at the SR1 182 side. The reference security features may include a code, like e.g., a Machine Readable Zone (or MRZ) that depends on predetermined data, like e.g., a user first name and a passport number, that are visually present within a user ID document, such as a user passport. The code may be used for accessing, through a CTL link(s), a chip incorporated within the concerned user ID document.

The memory 124 stores preferably an APN2, as a second APN and a second identifier relating to a second connectivity GW 164 to the SR2 184. The second identifier relating to the second connectivity GW 164 allows identifying, in a unique manner, the second connectivity GW 164. The second connectivity GW 164 is included within the MN(s) 16. The second connectivity GW 164 allows accessing the SR2 184.

The APN2 is preferably distinct from the APN1. The APN2 is associated with and dedicated to the SR2 184. The host 14 and/or another peripheral device(s) (not represented) incorporated within or coupled to the host 14 may store the APN2.

The memory 124 also stores one or several applications, as executable data. The executable data is intended to be executed by the SE processor 122, when applicable.

As application, the memory 124 stores an invention application, or termed applet (when written in Java language), for securing an access to one or several services.

The SE 12 is preferably configured to send, through the host 14, to the SR1 182 a request for enrolling a host 14 and/or SE 12 user 11 or the like.

The request for enrolling the host 14 and/or SE 12 user 11 may include or be accompanied with one or several features relating to a user identity.

Alternatively, instead of being associated in one and the same message, the request for enrolling the host 14 and/or SE 12 user and the user identity feature(s) are sent by using two or more separated messages. A first message including the request for enrolling the host 14 and/or SE 12 user may be sent, through the host 14, from the SE 12 while a second and possibly other message(s) including one or several concerned user identity features may be sent, through the host 14, from the SE 12, directly from the host 14 or from another device, such as a PC or a tablet, connected to e.g., a web portal relating to the SR1 182.

The request for enrolling the host 14 and/or SE 12 user includes or is accompanied preferably with one or several identifiers relating to the host 14 and/or the SE 12, like e.g., the IMEI, the ICCID and/or the IMSI, as one or several identifiers relating to the concerned (active) subscription.

To send to the SR1 182 a request for enrolling the host user, the SE 12 may be able to send to the host 14 a proactive command, like e.g., "Launch browser", as a request for launching a browser. The browser launching request includes or is accompanied with a URL1 and/or the like, as an identifier(s) relating to the SR1 182. The browser is embedded within the host 14.

Alternately or additionally, to send to the SR1 182 a request for enrolling the host 14 and/or chip 12 user, the SE 12 is able to send to the host 14 a proactive command, like e.g., "Display text", as a request for displaying a pop-up type message. The pop-up type message displaying request includes or is accompanied with a URL1 and/or the like, as an identifier(s) relating to the SR1 182.

Alternately or additionally, to send to the SR1 182 a request for enrolling the host 14 and/or chip 12 user, the SE 12 is able to send to the host 14 a proactive command, like e.g., "Send SMS", as a request for sending an SMS or an MMS type message. The SMS or MMS type message request includes or is accompanied with a link, an hyperlink to a URL1 and/or the like, as an identifier(s) relating to the SR1 182. The SMS or MMS type message may be previously stored within the SE 12 during its personalization.

The SE 12 is arranged to receive, preferably through the host 14, a message, as a command message, that includes a command for deactivating the restricted mode.

The command message includes or is accompanied preferably with the APN2.

The APN2 is associated with the SR2 184 that manages one or several services which the host 14 or SE 12 user desires an access to. The APN2 may be received from the SR1 182 or already stored locally and possibly localized and requested to be fetched by or through the SR1 182.

When the SE 12 executes the command for deactivating the restricted mode, the SE 12 is adapted to change or replace locally the APN1 by an APN2, so as to re-configure the host 14.

To deactivate the restricted mode, the SE 12 is adapted to store or let store, instead of the APN1, the APN2 within the host 14 or a host peripheral (not represented), like e.g., a smart watch, which is connected to the host 14.

The memory 124 may thus store, at least in a temporary manner, the APN2.

The APN2 may be received through or from the SR1 182 or stored, by default, within the memory 124 (during an SE 12 personalisation) or within the host 14 or a host 14 peripheral (not represented), like e.g., a smart watch, which is connected to the host 14.

To change or replace the APN1, the SE 12 may be arranged to transmit to the host 14 or a host 14 peripheral a command for storing the APN2 that is stored, at least in a temporary manner, within the memory 124.

Alternately, to change or replace the APN1, the SE 12 is arranged to let transmit to the host 14 from a server, as a device management server, a command for storing an APN2 that is included within or accompanied with the APN2 storing command. The SE 12 may neither receive nor store the APN2 according to such an alternate embodiment.

The SE 12 I/O interface(s) include preferably one or several I/O interfaces for exchanging data, over a ConTact (or CT) and/or CTL link(s) 13, with the host 14.

Instead of being embedded or integrated within the host 14, the SE 12 is connected or coupled to the host 14.

The host I/O interface with the SE 12 may be an International Organization for Standardization (or ISO) 7816 interface, as a CT interface, when the SE 12 is inserted, possibly in a removable manner, within the host 14.

Instead of a CT interface(s), the host I/O interface with the SE 12 is connected to or includes a CTL interface(s), like e.g., an ISO 14443 interface. The host 14 is connected to or includes means for communicating data while using preferably a Short Range (or SR) RF link. The SR RF link may be related to any technology that allows the host 14 to exchange data, through a so-termed CTL link with the SE 12. The SR RF may be fixed at 13.56 MHz. The SR RF may be related to a Near Field Communication (or NFC) type technology, a Bluetooth type technology and/or a Bluetooth low energy type technology, as a CTL technology(ies).

The host 14 includes preferably a display screen 142 and a keyboard 144, as a Man Machine Interface (or MMI). Alternately, instead of an integrated MMI, the host 14 is connected or coupled to an external MMI. According to another embodiment (not represented), the SE 12 includes or is connected to a display screen, a keyboard or both, as an external MMI. The host 14 carries out a modem function, so as to exchange data, over an antenna 146, with one (or several) MN(s) 16.

The antenna 146 allows communicating data, through a Long Range (or LR) RadioFrequency (or RF) link 15, with the MN(s) 16. The LR RF may be about 1 Ghz to about several Ghz.

The host 14 preferably includes, is connected or coupled to a camera(s) and/or a video camera(s) that allows the host 14 and/or SE 12 user to capture a feature(s) relating to the user identity, like e.g., a biometric sensor(s), to take an image of a user ID document(s), such as a user ID card, a user passport, an official user document and/or the like.

A host memory(ies) (not represented) may comprise one or several memories including one or several volatile memories and/or one or several non-volatile memories. The host memory(ies) may be constituted by one or several EEPROMs (acronym for "Electrically Erasable Programmable Read-Only Memory"), one or several ROMs (acronym for "Read Only Memory"), one or several Flash memories and/or any other memories of different types, like one or several RAMs (acronym for "Random Access Memory"). The host memory(ies) stores preferably, at least in a temporary manner, data relating to a configuration parameter(s) that allow(s) configuring an access, through a connected MN(s) 16, to a Packet Data Service (or PDS) network (not represented).

The configuration parameter(s) include(s) one or several APNs, like e.g., notably the APN1 and/or the APN2.

Each APN, as a configuration parameter, is the name of a GW between the MN 16 and a corresponding server 182 or 184. Each APN is used by the host 14 to open a Packet Data Protocol (or PDP) context and/or an Evolved Packet System (or EPS) Packet Data Network (or PDN) connection, through a GW, as described infra in more details. An APN structure comprises an identifier of a network, like e.g. a network identifier, which the GW is connected to. Optionally, the APN structure may comprise the service, like e.g., a Wireless Application Protocol (or WAP) server or an MMS. The APN structure may comprise an identifier of an MNO, like e.g., mnc<MNC>.mcc<MCC>.gprs, in which mnc is a Mobile Network Code and mcc is Mobile Country Code which together identify uniquely the MNO using notably the concerned mobile network(s), like e.g., a GSM, a UMTS and/or a LTE public land mobile network(s).

The host memory(ies) store(s) preferably e.g., an International Mobile Equipment Identity (or NEI), a URI, a URL, an IP address and/or an email address, as an identifier(s) relating to the host 14. The host memory stores an OS and one or several applications.

As application, the host 14 supports preferably an application that allows the user to capture one or several features relating to the user identity and/or to take an image relating to a user ID document(s), like e.g., a passport and/or an ID card of the host user. Once the user identity feature(s) is(are) captured and/or taken, the host 14 stores or lets store the user identity feature(s) within the host memory, the SE memory 124 or a host peripheral (or accessory) memory.

The host 14 is able to transmit, preferably under an SE 12 (and/or SR1 182) control, through the MN(s) 16, to the SR1 182 a request for enrolling the host 14 and/or SE 12 user 11. The user enrolling request may include or be accompanied with one or several user identity features.

The MN(s) 16 includes a home network with respect to the subscriber, as user of the SE 12 and/or the host 14. The MN(s) 16 is connected, through a bi-directional link 17, to the CN 18.

The CN 18 comprises or is connected to an Internet type network (not represented) or the like. The CN 18 comprises preferably (or is coupled or connected to) the SR1 182 and the SR2 184. Each of the SR1 182 and the SR2 184 is hosted by a computer. The computer includes a processor(s), as data processing means (not represented), comprises and/or is connected to a memory(ies), as data storing means (not represented), and contains one or several I/O interfaces (not represented).

The SR1 182 is identified by a URI1, a URL1, an IP address1 and/or the like, as an identifier(s) relating to the SR1 182 and a first server identifier(s). The first server identifier(s) may be stored within the SE memory 124 or a phone memory. The SR1 182 may be operated by a mobile (radio-communication) network operator, as an MNO and/or an MVNO, a user enrolment service provider(s) or on its(their) behalf. The SR1 182 may be included within an ecosystem (not represented), like e.g., a MNO (and/or MVNO) back-end system, that comprises several servers managed by the user enrolment service provider or on its(their) behalf. The SR1 182 is dedicated to running an application for managing a first database and communicating data of the first database to outside.

The first database includes preferably a set of an identifier(s) relating, each, to a client device and/or chip.

The identifier(s) may include notably an IMSI, an IMPI, an IMPU, a NAI, an ICCID, an eID, a CSN, an IMEI, an IMEI Software Version (or IMEI SV), an MEID, a UIMID, an EUIMID, an ESN, a URI, a URL, an IP address and/or the like.

Each thus identified client device is preferably associated with configuration data. The configuration data includes one or several APNs that are, each, associated with a second server, like e.g., the SR2 184, as data to be provisioned to the concerned subscriber device and/or chip.

The first database stores preferably one or several predetermined security features, as a reference security feature(s), that is(are) to be present within a user identity image, such as an ID card or passport image. Thus, the SR1 182 is configured to validate (or not) a user identity feature(s), i.e. to detect that an identified and/or submitted user identity feature(s) incorporate(s) preferably one or several security features that are expected according to a predetermined rule(s), like e.g., a nationality(ies), a country(ies) and/or a region(s) which a corresponding client user refers to.

The first database stores one or several predetermined commands for deactivating a restricted mode which a client device or chip operates with and blocks a connection or access to the SR1 182.

A memory(ies) (not represented) that is(are) accessible from the SR1 182 stores the first database.

The SR1 182 is configured to receive from a client device and/or chip, like e.g., the host 14 and/or the SE 12, a message, such as an SMS type or a MMS type message, including a request for enrolling a device or chip user. The user enrolment request includes or is accompanied preferably with one or several features relating to a user identity, as a user identity feature(s).

The SR1 182 is adapted to check or verify whether the (submitted) user identity feature(s) is(are) or is(are) not valid.

To verify whether the user identity feature(s) is(are) or is(are) not valid, the SR1 182 analyses preferably whether the user identity feature(s) do(es) or do(es) not include one or several predetermined reference security features respectively.

To analyse whether the user identity feature(s) do(es) or do(es) not include one or several predetermined reference security features, the SR1 182 compares information relating to the user identity to a reference user security feature that is registered at the SR1 182. The information relating to the user identity may have been extracted from an image of a user ID document(s) and submitted to the SR1 182 from the SE 12, the host 14 and/or another device connected to the SR1 182.

The SR1 182 is arranged to send, only if the user identity feature(s) is valid, preferably to a requesting client device and/or chip (or indirectly through another server connected to the SR1 182), a message that includes a command for deactivating a restricted (operation) mode (at the client device side). The concerned client device and/or chip is thus allowed to operate in an unrestricted mode and may then access to the SR2 184 and/or an(other) server(s), as a service provider.

The SR2 184 is preferably an OTA type server, a Trusted Service Manager type server or the like. The SR2 184 is preferably dedicated to running an application for managing a second database and possibly communicating data of the second database to outside.

Figure 2:
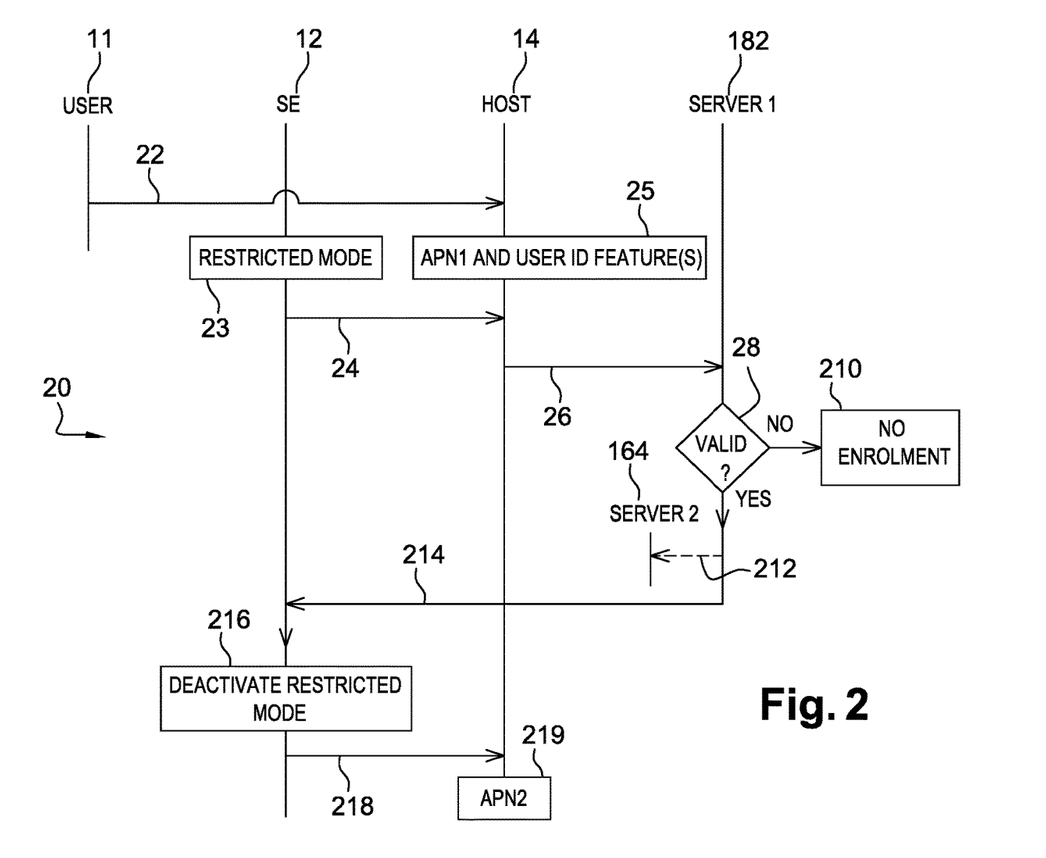
FIG. 2 illustrates an example of a flow of messages exchanged between notably the phone, the chip and the first server of FIG. 1, so that the chip uploads a user identity feature(s) to the first server that checks whether it(they) is(are) or not valid and, if yes, the first server allows the chip to deactivate the restricted mode and to change or let change the first APN by a second APN associated with the second server.

FIG. 2 depicts an exemplary embodiment of a message flow 20 involving the SE 12, the host 14, the SR1 182, as server1, the SR2 184, as server2, so as to deactivate a set restricted operation mode at a client side while addressing the SE 12, as a target.

In another scenario, instead of the SE 12, the host 14 is the target.

In the described scenario, it is assumed that the SE user 11, as a subscriber registered at the SR1 182 side, switches 22 on the host 14 while pushing a button provided on the host 14, that the SE 12 is set 23 to a restricted (operation) mode 13 and stores an APN2 associated with the SR2 184 and that the host 14 registers 25 an APN1 dedicated to the SR1 182 and a user identity feature(s). The SE 12 and the host 14 are locked to a restricted service managed by the SR1 182. A single subscription profile is active (or valid) during the restricted mode at the host side and at the MN side.

Once powered on, the SE 12 initiates automatically a user enrolment process.

To do this, the SE 12 sends a message 24 by using e.g., APDU command, for requesting the host 14 to send an SMS type message and/or the like that includes a request for enrolling the user 11 including (or being accompanied with) a user identity feature(s).

Once the host 14 receives the last message 24, the host 14 gets the locally registered user identity feature(s).

Then, the host 14 sends to the SR1 182 an SMS type message 26 comprising the registered user identity feature(s). The SMS type message 26 further comprises e.g., the IMEI, the ICCID and/or the IMSI, as one or several identifiers relating to the concerned (active) subscription.

The SR1 182 verifies 28 whether the (received) user identity feature(s) is(are) or is(are) not valid.

To verify whether the (received) user identity feature(s) is(are) or is(are) not valid, the SR1 182 detects a presence of one or several user identity features.

Alternately or additionally, to verify whether the (received) user identity feature(s) is(are) or is(are) not valid, the SR1 182 analyses whether the (received) user identity feature(s) do(es) or do(es) not satisfy a predefined data format(s), like e.g., a user first name, a user last name and/or a user residency address.

Alternately or additionally, to verify whether the (received) user identity feature(s) is(are) or is(are) not valid, the SR1 182 compares one or several of the (received) user identity feature(s) to one or several reference security feature(s), like e.g., one or several biometric prints.

If the user identity feature(s) is(are) not valid, then the SR1 182 does not allow 210 enrolling the user 11 and terminates the launched user enrolment process without letting the user 11 access any service managed by or through the SR2 184.

Otherwise, i.e. if the user identity feature(s) is(are) valid, the SR1 182 allows enrolling the user 11. In such a latter case, optionally, the SR1 182 sends to the SR2 184 a message 212 for informing the SR2 184 that the user 11 is enrolled and is allowed to access one or several services managed by or through the SR2 184. In such a latter case, the SR1 182 sends, through the host 14, to the SE 12 a message 214 comprising a command for deactivating the restricted mode preferably along with rights for deactivating the restricted mode.

Once the SE 12 receives the last message 214, after a successful verification of the provided rights for deactivating the restricted mode by the SE 12 (when applicable), the SE 12 deactivates 216 the restricted mode.

The subscription profile is still active (or valid) after the restricted mode deactivation at the host 14 side and at the MN 16 side.

To deactivate the restricted mode, the SE 12 sends to the host 14 a configuration message 218, by using e.g., APDU, comprising the APN2.

Alternately, the SE 12 sends to the host 14 a message (not represented) that allows the host 14 to send to a server, as a device management server, a request for downloading a corresponding APN2.

Once the APN2 is injected into the host 14, the SE 12 and the host 14 are unlocked to the restricted mode (after a possible re-boot of the host 14) and the user may access one or several services proposed, through the APN2, by the SR2 184. The services include e.g., a SIM type application(s) that allow(s) the host 14 to identify and authenticate the subscriber to one or several MN(s) 16.

The message 218 may be further signed by the SE 12, so as to prove that the SE 12 is the originator of the sent message 218.

The invention solution is compatible with the existing network infrastructure.

The invention solution allows configuring, in an automatic, quick, efficient and cheap manner, an SE host device while using one single subscription profile.

The invention solution does not need to involve the user, except for possibly submitting user identity feature(s), when applicable.

The invention solution is therefore transparent to the user. Thus, the user, when applicable, benefits from a good user experience.

The invention claimed is:

1. A method for securing an access to at least one service, a device being set in a restriction operation mode, the restricted operation mode allowing to address only a first server,
wherein the restricted operation mode being associated with a first identifier relating to a first connectivity gateway, the first connectivity gateway allowing to access the first server, the device accessing the first identifier relating to the first connectivity gateway, the device accessing a subscription profile, the subscription profile being active during the restricted operation mode, the method comprises the following steps:
the first server receives from the device or a chip a request for enrolling a user of the device or the chip, the request for enrolling the user of the device or the chip comprising or being accompanied with at least one feature relating to a user identity, as a user identity feature, the chip being embedded within or coupled to the device;
the first server or another server connected to the first server verifies whether the user identity feature is or is not valid;
only if the user identity feature is valid, the first server or another server connected to the first server sends to the device or, through the device, to the chip a command message including a command for deactivating the restricted operation mode;
the device or the chip deactivates the restricted operation mode while storing or letting store, instead of the first identifier relating to the first connectivity gateway, a second identifier relating to a second connectivity gateway, the second connectivity gateway allowing to access a second server, the subscription profile being still active after the restricted operation mode deactivation, the second server managing the at least one service.

2. The method according to claim 1, wherein the command message comprises or is accompanied with the second identifier relating to the second connectivity gateway.

3. The method according to claim 1, wherein the device or the chip stores the second identifier relating to the second connectivity gateway.

4. The method according to claim 1, wherein, to verify whether the user identity feature is or is not valid, the first server or another server connected to the first server verifies whether the user identity feature does or does not include one or several predetermined reference security features respectively.

5. The method according to claim 1, wherein the restricted operation mode further includes at least one element of a group comprising:
at least one phone call number dedicated to at least one predetermined phone call service; and
at least one number dedicated to at least one predetermined message service.

6. The method according to claim 1, wherein, to send to the first server the request for enrolling the device or chip user, the device receives:
a request for launching a browser, the request for launching the browser comprising or being accompanied with at least one identifier relating to the first server, the browser being comprised within the device; or
a request for displaying a pop-up type message, the request for displaying the pop-up type message comprising or being accompanied with at least one identifier relating to the first server; or
a request for sending a message, the request for sending the message comprising or being accompanied with a link to at least one identifier relating to the first server.

7. The method according to claim 1, wherein, the subscription profile includes at least one identifier relating to the subscription, the request for enrolling the device or chip user comprises or is accompanied with the at least one identifier relating to the subscription and/or the request for enrolling the device or chip user further comprises or is accompanied with at least one identifier relating to the device and/or the chip.

8. A device for securing an access to at least one service, the device comprising a hardware processor, the hardware processor of the device set in a restricted operation mode, the restricted operation mode allowing to address only a first server,
wherein, the restricted operation mode is associated with a first identifier relating to a first connectivity gateway, the first connectivity gateway allowing to access the first server, the device accessing the first identifier relating to the first connectivity gateway, the device accessing a subscription profile, the subscription profile being active during the restricted operation mode, and wherein the device by the way of the hardware processor is configured to:

send a request for enrolling a user of the device or the chip, the request for enrolling the device or chip user comprising or being accompanied with at least one feature relating to a user identity, as a user identity feature;

receive a command message including a command for deactivating the restricted operation mode;

deactivate the restricted operation mode while storing or letting store, instead of the first identifier relating to the first connectivity gateway, a second identifier relating to a second connectivity gateway, the second connectivity gateway allowing to access a second server, the subscription profile being still active after the restricted operation mode deactivation, the second server managing the at least one service.

9. The device according to claim 8, wherein the device includes an eUICC or an iUICC.

10. A system for securing an access to at least one service, wherein the system comprises at least a first server and at least one device, the at least one device being set in a restricted operation mode, the restricted operation mode allowing to address only the first server, the restricted operation mode being associated with a first identifier relating to a first connectivity gateway, the first connectivity gateway allowing to access the first server, the at least one device accessing the first identifier relating to the first connectivity gateway, the at least one device accessing a subscription profile, the subscription profile being active during the restricted operation mode;

wherein the first server and/or another server connected to the first server is configured to:

receive from the at least one device or a chip a request for enrolling a user of the device or the chip, the request for enrolling the at least one device or chip user comprising or being accompanied with at least one feature relating to a user identity, as a user identity feature, the chip being embedded within or coupled to the at least one device;

verify whether the user identity feature is or is not valid;

send, only if the user identity feature is valid, to the device or, through the device, to the chip of the at least one device a command message including a command for deactivating the restricted operation mode; and wherein the at least one device or the chip is configured to deactivate the restricted operation mode while storing or letting store, instead of the first identifier relating to the first connectivity gateway, a second identifier relating to a second connectivity gateway, the second identifier relating to a second connectivity gateway allowing to access a second server, the subscription profile being still active after the restricted operation mode deactivation, the second server managing the at least one service.

* * * * *